May 31, 1932.  P. COX  1,861,336
AIRPLANE
Filed Sept. 3, 1931   2 Sheets-Sheet 1

WITNESS
J. M. Markey

INVENTOR
Patrick Cox
BY
ATTORNEY

May 31, 1932.　　　　P. COX　　　　1,861,336
AIRPLANE
Filed Sept. 3, 1931　　　2 Sheets-Sheet 2
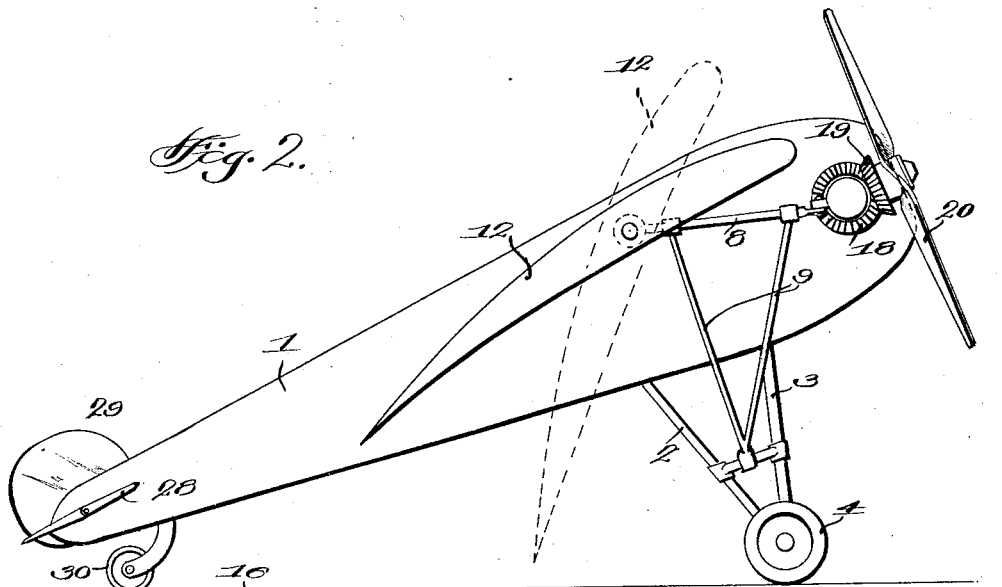
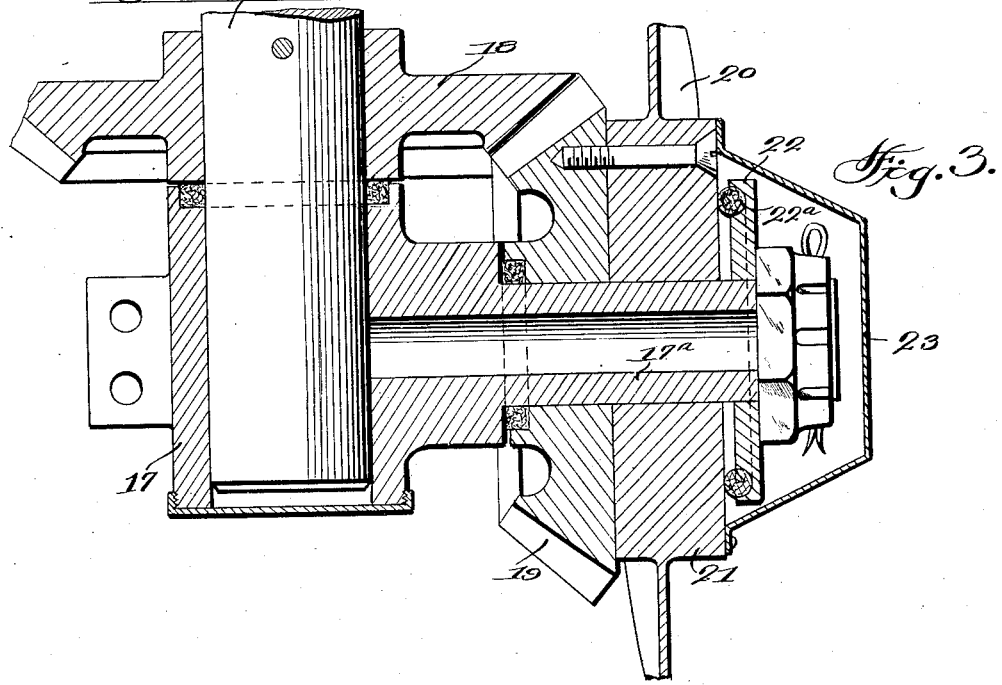
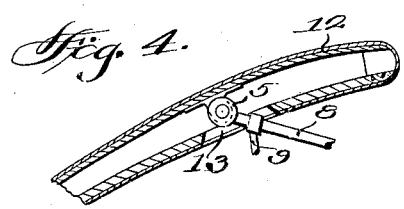
WITNESS
J. Markey
INVENTOR
Patrick Cox
BY
Munn & Co.
ATTORNEY Patented May 31, 1932

1,861,336

UNITED STATES PATENT OFFICE

PATRICK COX, OF LAKE WORTH, FLORIDA

AIRPLANE

Application filed September 3, 1931. Serial No. 561,047.

My invention relates to improvements in airplanes, and it consists in the combinations, constructions and arrangements herein described and claimed.

An object of my invention is to provide an airplane which can take off or land in a comparatively limited space.

A further object of the invention is to provide an airplane of the type mentioned in which wings are provided that can be simultaneously moved to raise the airplane quickly when it is desired to ascend or to stop it quickly when landing.

A further object of the invention is to provide an airplane with two propellers that are balanced in such a manner that the simultaneous movement of the wings may be accomplished without causing a rotary or rolling movement of the plane on its axis.

A further object of the invention is to provide means whereby the wings may be simultaneously shifted while at the same time the bracing of the wing structure is rigidly maintained.

Other objects and advantages will appear in the following specification, and the novel features of the invention will be particularly pointed out in the appended claims.

My invention is illustrated in the accompanying drawings forming a part of this application, in which:

Figure 2 is a side elevation of the device;

Figure 3 is an enlarged sectional view, showing the mounting of a propeller and its associated drive shaft; and Figure 4 is a sectional view through a portion of one of the wings.

Figure 1:
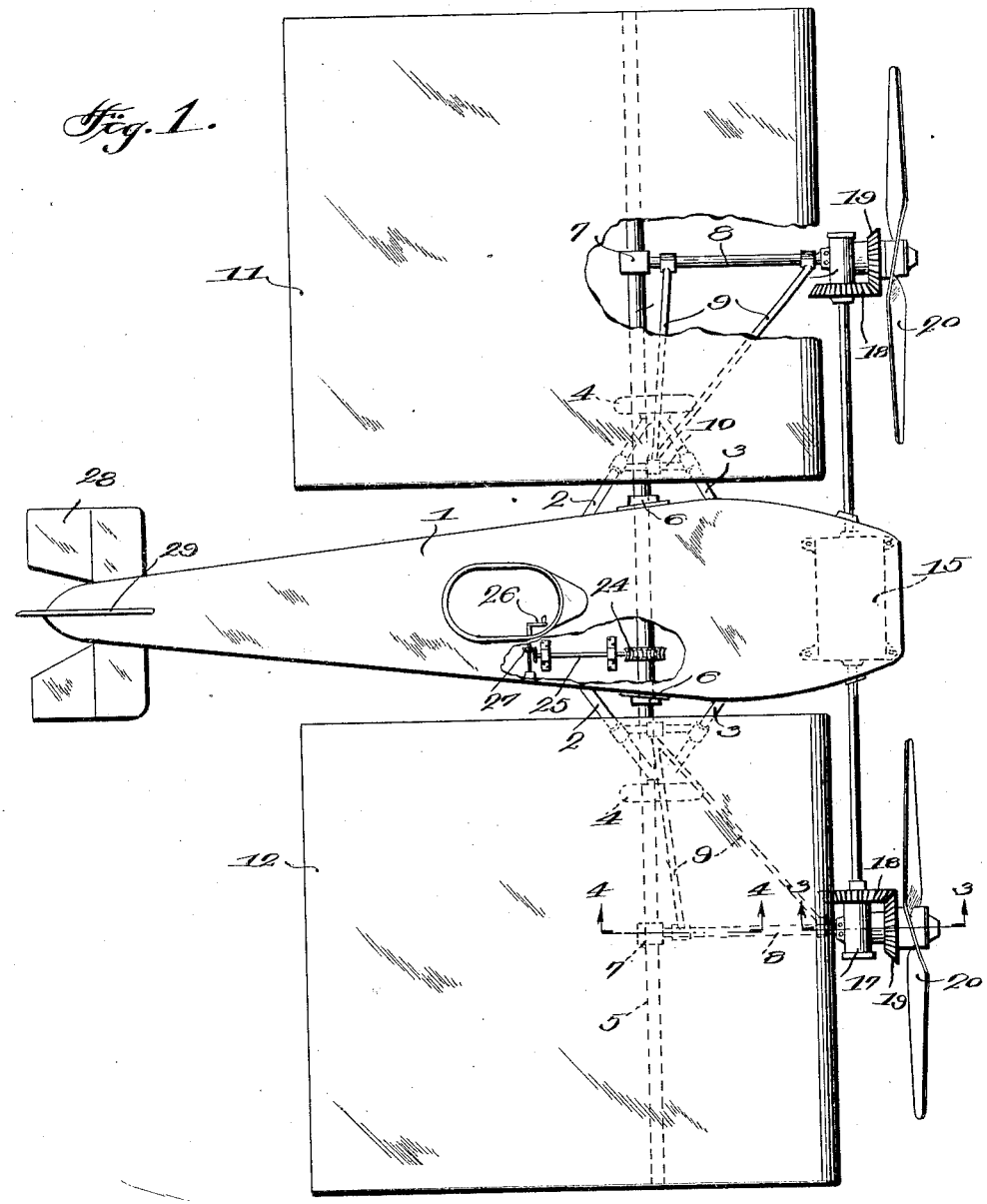
Figure 1 is a plan view, showing one embodiment of my invention, one of the wings being cut away to show the bracing means.

In carrying out my invention I provide a body portion or fuselage 1 having carriage struts 2 and 3 extending therefrom on each side. Secured to these struts are the front wheels 4.

Extending through the body portion 1 at right angles to the longitudinal axis thereof is a tubular shaft 5, bearings 6 being provided on the body. In addition to these bearings are auxiliary bearings 7. Extending from the bearings 7 are rods 8 which form supports for the driving means of the propellers. Each of these rods 8 is connected by brace members 9 with a cross bar or rod 10 disposed between and connecting the struts 2 and 3.

Wings 11 and 12 are provided on opposite sides of the body of the airplane, and these wings are secured to the shaft 5 to turn therewith. The rods 8 pass through slots 13 in the lower portions of the wings, as shown in Figure 4, and the shaft 5 extends through the bearings 7 and is rotatable therein for a purpose hereinafter explained.

The airplane is designed to be driven by any suitable type of motor, such as that shown diagrammatically at 15. The main shaft 16 of the motor is extended outwardly on each side. Each end of this drive shaft 16 enters a bearing 17 which is secured to the rod 8. The shaft 16 has at each end a bevel gear 18 arranged to mesh with a bevel gear 19. Secured to the latter is the hub of the propeller 20.

As will be seen from Figure 3, gear 19 is mounted on a sleeve 17a, which is a prolongation of the main bearing 17. This sleeve has a plate 22 and a felt washer 22a is held thereby for preventing the escape of lubricant. A protecting casing 23 is disposed over the end of the extension and it also covers the plate 22.

The shaft 5 has mounted thereon a worm gear 24 arranged to be engaged by a worm on a shaft 25, which may be operated by a crank 26 in the cockpit through the medium of bevel gearing 27.

The body portion is provided with the usual elevating wings 28, rudder 29 and rear wheel 30.

From the foregoing description of the various parts of the device, the operation will be readily understood. The rotation of the shaft 16 by the engine drives the propellers 20 through the medium of the gears 18 and 19. When it is desired to take off, the crank 26 in the cockpit is rotated to bring the wings into a position which is designed to receive the slip stream from the propellers. I have shown the shifted position of the wings in Figure 2 in dotted lines. The airplane will rise very rapidly, and when sufficient height has been attained, the wings may be brought into the full line position for sustained flight by the operation of the crank 26.

The device makes a long run for ascending unnecessary, since by shifting the wings the upward movement is such as to elevate the plane rapidly, and thus obviates the necessity of a long field.

In descending, the wings may be shifted to oppose the descent so as to slow the movement of the plane and thus a landing may be made at a comparatively low speed and in a relatively small space.

I claim:

An airplane construction comprising a fuselage having bearings, a transverse shaft mounted in the bearings of the fuselage, carriage struts on each side of said fuselage, auxiliary bearings for said transverse shaft, a rod secured to each of said auxiliary bearings, brace members connecting said rods and said carriage struts, a transversely disposed drive shaft, means carried at the end of said rods for transmitting movement from said drive shaft, a propeller disposed in front of each of said wings, means for driving said propellers from said drive shaft, and means disposed within the cockpit of the airplane for rotating the transverse shaft whereby the wings may be shifted to various angular positions with respect to the longitudinal axis of the airplane.

PATRICK COX.